(12) United States Patent
Liu

(10) Patent No.: US 10,913,509 B2
(45) Date of Patent: Feb. 9, 2021

(54) INDEPENDENT SUSPENSION SELF-BALANCING ELECTRIC VEHICLE

(71) Applicant: Shenzhen Future Dog Technology Co., Ltd., Guangdong (CN)

(72) Inventor: Zefeng Liu, Guangdong (CN)

(73) Assignee: Shenzhen Future Dog Technology Co., Ltd., Shenzhen (CN)

(*) Notice: Subject to any disclaimer, the term of this patent is extended or adjusted under 35 U.S.C. 154(b) by 256 days.

(21) Appl. No.: 16/053,822

(22) Filed: Aug. 3, 2018

(65) Prior Publication Data

US 2019/0127015 A1    May 2, 2019

(30) Foreign Application Priority Data

Oct. 30, 2017   (CN) .......................... 2017 1 1042299

(51) Int. Cl.
| | |
|---|---|
| *B62K 25/04* | (2006.01) |
| *B60C 7/12* | (2006.01) |
| *B62K 11/00* | (2006.01) |
| *B62D 11/04* | (2006.01) |
| *B60C 11/12* | (2006.01) |
| *B60C 11/03* | (2006.01) |

(52) U.S. Cl.
CPC .............. *B62K 25/04* (2013.01); *B60C 7/12* (2013.01); *B60C 11/12* (2013.01); *B62D 11/04* (2013.01); *B62K 11/007* (2016.11); *B60C 11/0311* (2013.01); *B62K 2202/00* (2013.01); *B62K 2204/00* (2013.01)

(58) Field of Classification Search
CPC ...... B62K 11/00; B62K 11/007; B62K 25/04; B62K 2202/00; B62D 11/04; B60C 7/10; B60C 7/14; B60C 7/143; B60C 2007/146; B60B 9/00; B60B 9/10
See application file for complete search history.

(56) References Cited

U.S. PATENT DOCUMENTS

| | | | | |
|---|---|---|---|---|
| 7,958,956 | B2* | 6/2011 | Kakinuma | A63C 17/08 180/218 |
| 9,751,270 | B2* | 9/2017 | Thompson | B60C 7/102 |
| 10,390,669 | B2* | 8/2019 | Kim | B60B 3/082 |
| 10,556,465 | B2* | 2/2020 | Turozi | B60C 7/10 |
| 2005/0248115 | A1* | 11/2005 | Huhmarkangas | B60G 3/20 280/124.111 |

(Continued)

*Primary Examiner* — Ruth Ilan
*Assistant Examiner* — Maurice L Williams

(57) ABSTRACT

An independent suspension self-balancing electric vehicle comprising a main frame, two wheel assemblies, suspension assemblies, a shock absorber device and a power control module, therein two wheel assemblies are respectively defined on both sides of the main frame, the wheel assemblies are connected to the main frame by the suspension assemblies, the shock absorber device is respectively connected to the main frame and the suspension assemblies, and the power control module is configured to drive wheels to rotate and control the independent suspension self-balancing electric vehicle to steer; the number of the suspension assemblies are two, each of the wheel assemblies are connected to the main frame by one suspension assembly, and the each of the wheel assemblies individually jumps while the independent suspension self-balancing electric vehicle is driven on an undulating road surface and a stair step to obtain well passivity and shock absorbing performance.

8 Claims, 6 Drawing Sheets

(56) References Cited

U.S. PATENT DOCUMENTS

| | | | |
|---|---|---|---|
| 2008/0147281 A1* | 6/2008 | Ishii | B62D 51/02 |
| | | | 701/49 |
| 2008/0197597 A1* | 8/2008 | Moulene | B62D 21/183 |
| | | | 280/124.103 |
| 2016/0185411 A1* | 6/2016 | Hadley | B62K 5/02 |
| | | | 180/210 |
| 2017/0008342 A1* | 1/2017 | Martin | B60C 7/14 |
| 2017/0057289 A1* | 3/2017 | Pratt | B60C 7/143 |
| 2018/0029422 A1* | 2/2018 | Thompson | B60C 11/0041 |

* cited by examiner

INDEPENDENT SUSPENSION SELF-BALANCING ELECTRIC VEHICLE

CROSS REFERENCE TO RELATED APPLICATIONS

The present application claims the benefit of Chinese Patent Application No. 201711042299.7 filed on Oct. 30, 2017. All the above are hereby incorporated by reference.

FIELD OF THE INVENTION

The present application relates to a technical field of a balance car, and more particularly relates to an independent suspension self-balancing electric vehicle.

BACKGROUND OF THE INVENTION

Due to a special working principle of a balance car, most of existing balance cars cannot be cooperated with a slightly complicated terrain, even those who claim to be cross-country, when encountering an intersection of motorway and sidewalk, or encountering bricks, or encountering a high speed bump, it is often necessary for a user to get off the car. In the above situation, if the balance car muscles its way to pass through, it will make a driver dangerous. Unlike other cars, the balance car cannot lose control for a moment, thus, better pass means safer.

SUMMARY OF THE INVENTION

In order to solve the above problems, the present invention provides an independent suspension self-balancing electric vehicle with well passivity and shock absorption performance on highly undulating roads and stair steps.

In order to achieve the above object, the technical solution applied in the present invention is shown as following:

An independent suspension self-balancing electric vehicle comprising a main frame, two wheel assemblies, suspension assemblies, a shock absorber device and a power control module, two wheel assemblies are respectively defined on both sides of the main frame, the wheel assemblies are connected to the main frame by the suspension assemblies, the shock absorber device is respectively connected to the main frame and the suspension assemblies, and the power control module is configured to drive wheels to rotate and control the independent suspension self-balancing electric vehicle to steer; and the number of the suspension assemblies are two, each of wheel assemblies is connected to the main frame by one suspension assembly, and the each of the wheel assemblies individually jumps while the independent suspension self-balancing electric vehicle is driven on an undulating road surface.

Advantageously, suspension assemblies comprise wheel axle seats connected to the wheel assemblies, and upper swing arms and lower swing arms, first ends of the upper swing arms and the lower swing arms are all hinged to the main frame, second ends of the upper swing arms and the lower swing arms are all hinged to wheel axle seats.

Advantageously, the upper swing arms and the lower swing arms are arranged side by side in a vertical plane, and the wheel axle seats, the upper swing arms, the lower swing arms, and the main frame form a quadrangular structure.

Advantageously, the shock absorber device comprises spring shock absorbers, and both ends of the spring shock absorbers are connected to the main frame and the lower swing arms, respectively.

Advantageously, the upper swing arms are connected to the wheel axle seats and the main frame by movable joints; the lower swing arms are connected to the wheel axle seats and the main frame by movable joints.

Advantageously, two groups of the suspension assemblies are arranged symmetrically left and right.

Advantageously, the wheel assemblies comprises anti-slip tires, wheel hubs mounted inside the anti-slip tires and configured to support the anti-slip tires, and wheel axles for connecting motors and wheel axle seats.

Advantageously, the anti-slip tires comprise tire main bodies and several groove structures, cross sections of inside parts of the groove structures in tire radial directions are fan-shaped, and several groove structures are evenly spaced on a surface of the anti-slip tires in contact with the ground, and the groove structures can be stuck at protruding corners of stair steps when climbing the stair steps.

Advantageously, the tire main bodies comprise elastically deformable structures for deforming the anti-slip tires after the protruding corners are embedded in and press the groove structures; the tire bodies comprise elastomers defined in inner layers of the tire bodies.

Advantages of an application of the present invention are:

The independent suspension self-balancing electric vehicle comprises two suspension assemblies, each of which is connected to the main frame by one suspension assembly, and each wheel assembly individually jumps while the independent suspension self-balancing electric vehicle travels on an undulating road surface. At the undulating road surface, each group of suspension systems can respectively drive one wheel assembly to jump separately, so that the independent suspension self-balancing electric vehicle has well passivity and shock absorption performance on highly undulating roads and stair steps.

Secondly, the suspension assembly forms a quadrilateral geometric suspension mode through the upper swing arm, the lower swing arm, the wheel axle seat and the main frame, and combines the position and angle of the shock absorber to make the independent suspension self-balancing electric vehicle have superior shock absorption performance.

In addition, the anti-slip tire can be engaged with protruding corners of the stair steps by the groove structure, so that the tire can be engaged with the protruding corners of the stair steps by the groove structure, it is easy to climb the stair steps when the tire is driven by power. An elastically deformable structure and an elastomer defined in a tire main body enable the groove structure to be deformed after being stressed, so that the inner wall of the groove structure is appropriately deformed according to a shape of the stair steps, so that the inner wall of the groove structure is well fitted on surfaces of the stair steps.

Figure 1:
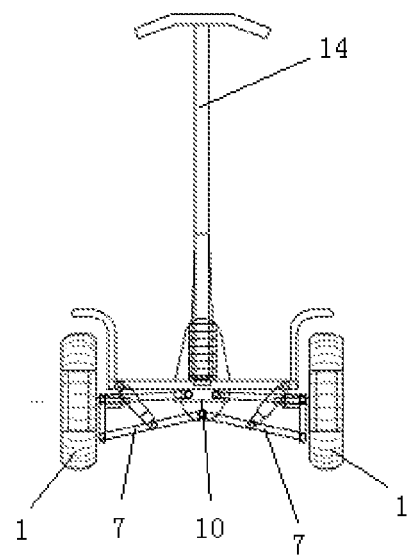
FIG. 1 is a schematic overall view of an all-terrain balancing car of the present invention.

The reference numbers comprise:
1—anti-slip tire
2—wheel hub
3—motor
4—wheel axle
5—wheel axle seat
6—upper swing arm
7—lower swing arm
8—shock absorber
9—control board
10—main frame
11—battery assembly
12—angle sensor
13—rotational automatic returning mechanism
14—steering rod
15—movable joint
101—groove structure
102—elastically deformable structure
103—tire surface
104—elastomer

DETAILED DESCRIPTION OF THE PREFERRED EMBODIMENT

The present invention is described in detail below with reference to the accompanying drawings.

As shown in FIG. 1 to FIG. 5, a present embodiment provides an independent suspension self-balancing electric vehicle comprising a main frame 10, two wheel assemblies, suspension assemblies, a shock absorber device and a power control module, therein two wheel assemblies are respectively defined on both sides of the main frame 10, the wheel assemblies are connected to the main frame 10 by the suspension assemblies, the shock absorber device is respectively connected to the main frame 10 and the suspension assemblies, and the power control module is configured to drive wheels to rotate and control the independent suspension self-balancing electric vehicle to steer; the number of the suspension assemblies are two, each of wheel assemblies is connected to the main frame 10 by one suspension assembly, and the each of the wheel assemblies individually jumps while the independent suspension self-balancing electric vehicle is driven on an undulating road surface.

The independent suspension self-balancing electric vehicle comprises two suspension assemblies, each of which is connected to the main frame 10 by one suspension assembly, and each wheel assembly individually jumps while the independent suspension self-balancing electric vehicle travels on an undulating road surface. At the undulating road surface, each group of suspension systems can respectively drive one wheel assembly to jump separately, so that the independent suspension self-balancing electric vehicle has well passivity and shock absorption performance on highly undulating roads and stair steps.

In this embodiment, one wheel assembly comprises: anti-slip tires 1, wheel hubs 2, motors 3; one suspension assembly comprises wheel axle seats 5, lower swing arms 6, lower swing arms 7, and a shock absorber; a steering assembly comprises: a steering rod 14, an angle sensor 12, and a rotational automatic returning component 13; therein each of the anti-slip tires 1 is mounted on each of the wheel hubs 2, and each of the motors 3 is defined inside each of the wheel hubs 2; each of the wheel axle seats 5 is defined on each of the wheel axles 4, the wheel axles 4 and the wheel axle seats 5 are distributed on a left side and a right side; an another side of each of the wheel axle seats 5 is connected to each of the upper swing arms 6 and each of the lower swing arms 7, the upper swing arms 6 and the lower swing arms 7 are symmetrically distributed, and the other ends of the upper swing arms 6 and the other ends of the lower swing arm 7 are connected to a middle part of the main frame 10 and distributed under the main frame 10; the shock absorber is connected between the upper swing arms 6, the lower swing arms 7 and the main frame 10, and is symmetrically distributed on a left side and a right side; the steering rod 14, the rotation automatic returning component 13 and the angle sensor 12 are mounted in front of the main frame 10. From the perspective of the bottom view, the upper swing arms 6 and the lower swing arms 7 may be provided with reinforcing members or reinforcing beams connected to the main frame 10.

Suspension assemblies comprise the wheel axle seats 5 connected to the wheel assemblies, and the upper swing arms 6 and the lower swing arms 7, first ends of the upper swing arms 6 and the lower swing arms 7 are all hinged to the main frame 10, second ends of the upper swing arms 6 and the lower swing arms 7 are all hinged to wheel axle seats 5. The upper swing arms 6 and the lower swing arms 7 are arranged side by side in a vertical plane, and the wheel axle seats 5, the upper swing arms 6, the lower swing arms 7, and the main frame 10 form a quadrangular structure. The shock absorber device comprises shock absorbers, and both ends of the shock absorbers are connected to the main frame 10 and the lower swing arms 7, respectively. The upper swing arms 6 are connected to the wheel axle seats 5 and the main frame 10 by movable joints 15; the lower swing arms 7 are connected to the wheel axle seats 5 and the main frame 10 by movable joints 15. Two groups of suspension assemblies are arranged symmetrically left and right.

In the present embodiment, lower ends of the shock absorbers are connected to middle parts of the lower swing arms 7, and upper ends of the shock absorbers are connected to a side of the main frame 10 close to the wheel assemblies, so that two shock absorbers are defined obliquely upward and outward. In one embodiment, a shock absorber may be a spring or a barrel shock absorber, and the barrel shock absorber may be hydraulic or the air pressured, or may be mixed. Positions where ends of the shock absorbers are connected to the main frame 10 and the lower swing arms 7 form a splayed shape, or an inverted splayed word, or a vertical installation.

In this embodiment, the suspension assemblies further comprise movable joints 15 configured to connect the wheel axle seats 5 to the upper swing arms 6 and the lower swing arms 7, to connect the upper swing arms 6 to the lower swing arms 7 and the main frame 10, to connect the shock absorbers to the main frame 10 and the lower swing arms 7. The movable joints 15 are configured to ensure that the independent suspension self-balancing electric vehicle is free to be deformed when it is bumped by uneven road surface to offset a ground impact and maintain a stable balance of a frame.

Figure 2:
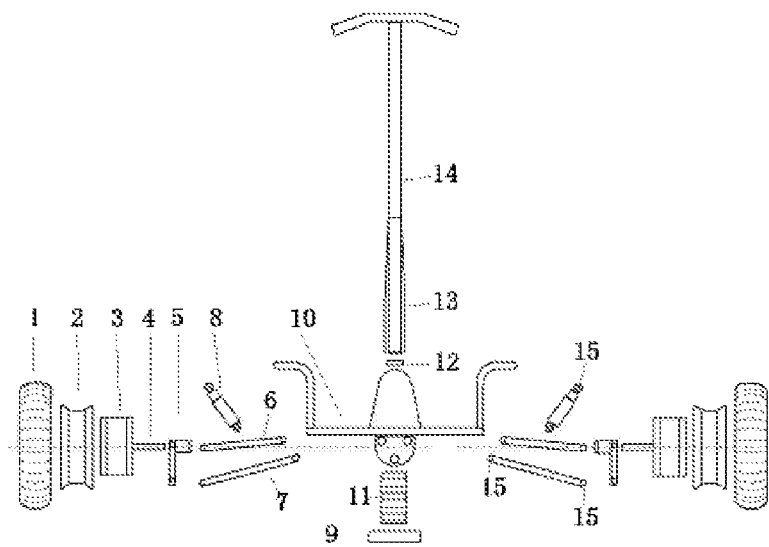
FIG. 2 is a schematic exploded view of an independent suspension self-balancing electric vehicle of the present invention.

As shown in FIG. 1 to FIG. 2, a control board 9 controlled by a gyroscope is installed at a position below a middle part of the main frame 10, and the battery assembly 11 is mounted above the middle part of the main frame 10. In other embodiments, the battery assembly 11 can also be mounted in a middle part or both sides of the underside of the main frame 10.

The steering rod 14 of the steering assembly is concentrically connected to the rotational automatic returning component 13 and the angle sensor 12 and mounted to a front side of the main frame 10.

In the present invention, the shock absorbers 8 may be mounted vertically to the main frame 10 or may be mounted obliquely to the main frame 10.

The idea of the present invention is that when the independent suspension self-balancing electric vehicle travels on a severely uneven road surface, the main frame 10 tends to follow ups and downs of the road surface and adapt to an inclination of the road surface, which may make it difficult for a driver to stand up and cause difficulty in driving or resulting in danger. In order to adapt the independent suspension self-balancing electric vehicle to a slippery road surface, the independent suspension self-balancing electric vehicle further uses the anti-slip tires 1. In order to allow a frame suspension structure to have more space for movement, the motors 3 supplied with power is installed in the wheel hubs 2 to save space. In the case of high-speed steering, in order to make the frame well tilt with the driver to offset a centrifugal force during turning, the steering mechanism is designed to be a working mode that the steering mechanism is fixed front, rear, left and right, but the steering rod 14 can be rotated. The motors 3 in this embodiment are in-wheel motors. In the present embodiment, they are mounted at the center of the wheel hubs 2, and in other embodiments, the motors 3 are mounted at eccentric positions.

The working principle is that the battery assembly 11 provides all the required energy sources for the independent suspension self-balancing electric vehicle. The control board 9 based on a gyroscope balance control principle is installed in the middle of the independent suspension self-balancing electric vehicle. When the driver leans back and forth, the gyroscope outputs a compensation angle to the control board 9. The control board 9 rotates the motors 3 by a certain angle to maintain the balance of the independent suspension self-balancing electric vehicle. When the independent suspension self-balancing electric vehicle passes the uneven road surface, the suspension assemblies of the frame perform a quadrilateral deformation to maintain levelness of the frame.

Figure 3:
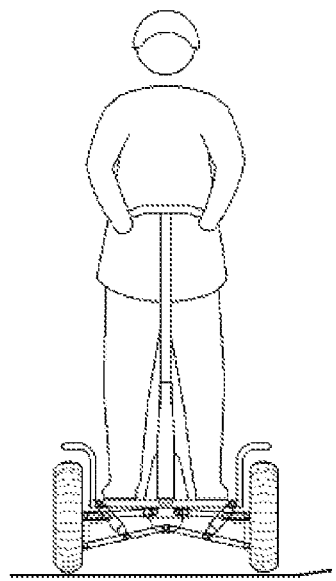
FIG. 3 is a diagram of a state of the independent suspension self-balancing electric vehicle when the independent suspension self-balancing electric vehicle of the present invention is driven by an independent suspension self-balancing electric vehicle driver.
Figure 4:
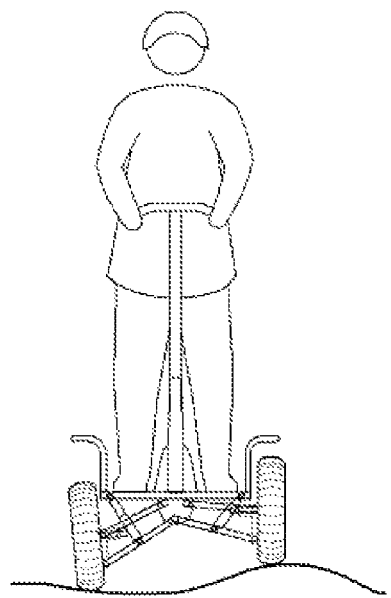
FIG. 4 is a diagram of a state of the independent suspension self-balancing electric vehicle when the independent suspension self-balancing electric vehicle of the present invention is on an uneven road surface.
Figure 5:
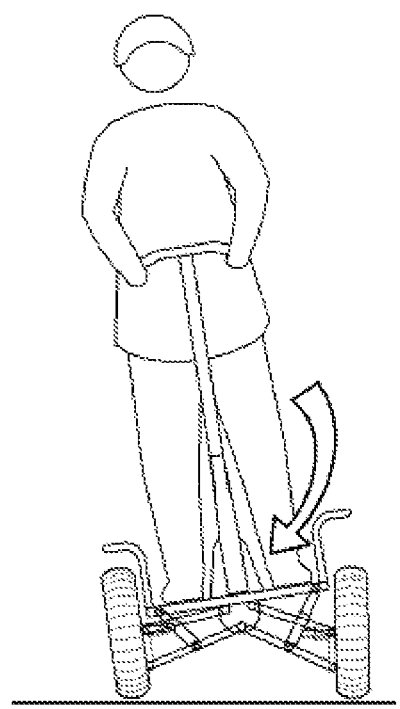
FIG. 5 is a diagram of a state of the independent suspension self-balancing electric vehicle when the independent suspension self-balancing electric vehicle of the present invention is steered by a driver at a high speed.

As shown in FIG. 3 to FIG. 5, in the present embodiment, compressions and extensions of shock absorbers 8 enable the wheel assemblies on both sides of the independent suspension self-balancing electric vehicle to undulate up and down respectively, and the wheel undulation on each side is completed based on the quadrilateral deformation formed by the wheel axle seats 5, the upper swing arms 6, the lower swing arms 7 and the main frame 10, the ultimate compressions and extension ranges of the shock absorbers 8 determine the maximum deformation shapes of the quadrilateral, and the driver's weight and driving posture determine the degree of undulation of each wheel.

As shown in FIG. 3, when straightly driving on a normal flat road, the driver stands vertically and the ground is horizontal, so the suspension assemblies are evenly stressed, wheels on both sides are evenly undulating, and the frame of the independent suspension self-balancing electric vehicle is substantially perpendicular to the ground.

As shown in FIG. 4, when straightly driving on an uneven road, the driver stands vertically, the ground is undulating, the suspension assemblies are unevenly stressed, the wheels on both sides are undulating with the ground, and the frame of the independent suspension self-balancing electric vehicle is substantially perpendicular to the ground.

As shown in FIG. 5, when turning at high speed on a flat road, the center of gravity of the driver is inclined toward the turning side, and the steering rod 14 is also tilted toward the turning side. Since the steering rod 14 is fixed between the front and rear sides of the frame, the frame is also tilted towards the turning side, forces on turning sides of the suspension assemblies are greater than forces on being turned sides, so a shock absorber 8 on the turning side is compressed, and a shock absorber 8 on the being turned side is extended, and the frame is inclined with respect to the ground, thereby making the steering driving stable.

In general, the independent suspension self-balancing electric vehicle can automatically adapt to various uneven roads while driving on a straight line to keep the frame and the driver stable, and when turning or according to driver's requirements, the frame is tilted left and right to ensure that the driver is safer when doing these actions.

In other embodiments, the battery assembly 11 and the control board 9 can be mounted at any position of the frame, provided that the suspension assemblies do not interfere with operation and do not interfere with the driver's normal driving, and that the motors 3 and the wheel hubs 2 can be separated or configured as a whole, advantage of separation is that it is convenient to repair and replace a tire. Advantage of an integral configuration of a wheel hub 2 and a motor 3 is that the structure is simple, cost can be reduced and weight of the whole car can be reduced.

The independent suspension self-balancing electric vehicle of the invention can be used as a personal car with complicated terrain, and can obtain better safety than other balance cars even when used on a normal road surface, because the normal flat road that is normally used may often encounter potholes or sudden obstacles, such as stair steps on an intersection of motorway and sidewalk, building waste on the ground, short-distance grass, etc., an application of the independent suspension self-balancing electric vehicle of the present invention allows the driver to pass safer and faster when not paying attention By applying the present invention, an all-terrain personal transportation device which is small, cheap, light, portable, safe and practical can be manufactured, which makes people travel more convenient and quick, and increases driving pleasure without losing safety.

In the present embodiment, the anti-slip tires 1 have superior rock climbing performance. In other embodiments, the anti-slip tires can also be other forms of tires, such as solid tires, pneumatic tires, and the like. The anti-slip tires 1 are defined on an outer ring of the wheel hubs 2 to support a car body, cushion external impact, achieve contact with a road surface and ensure driving performance of the car.

The present invention is described in detail below with reference to the accompanying drawings.

Figure 6:
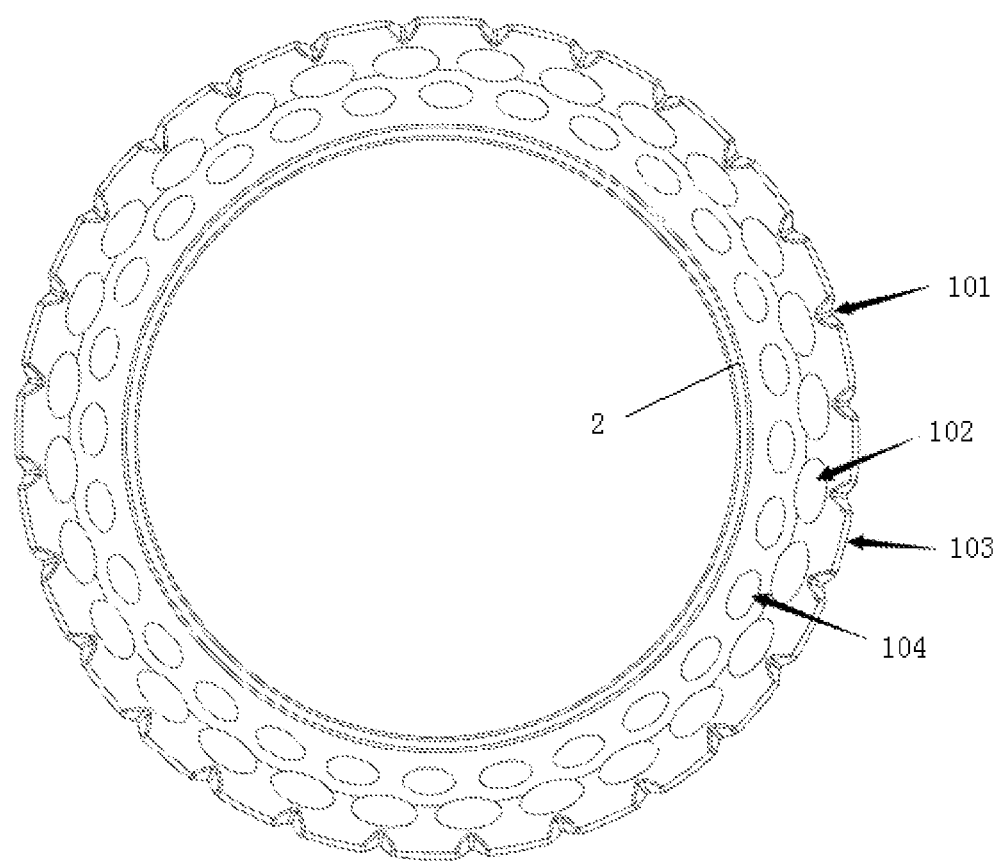
FIG. 6 is a schematic view showing an overall structure of a tire in an independent suspension self-balancing electric vehicle of the present invention.
Figure 7:
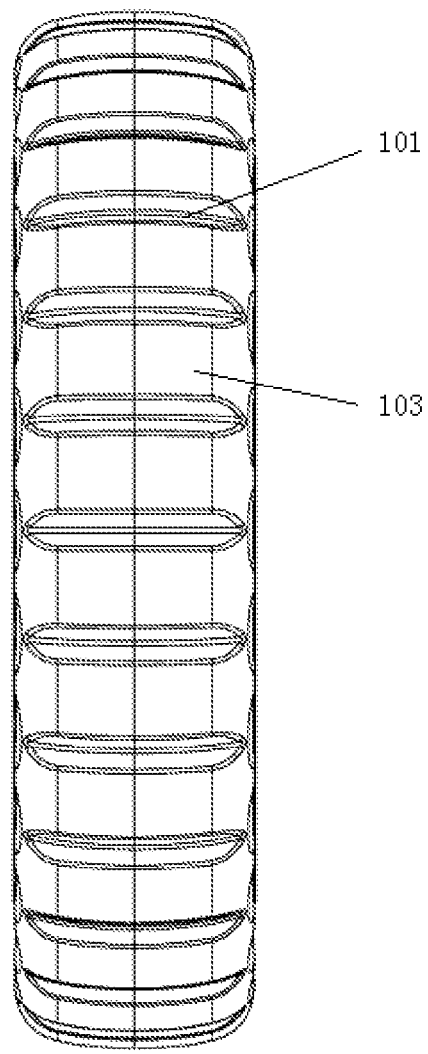
FIG. 7 is a schematic view from a tire surface direction of the independent suspension self-balancing electric vehicle of the present invention.
Figure 8:
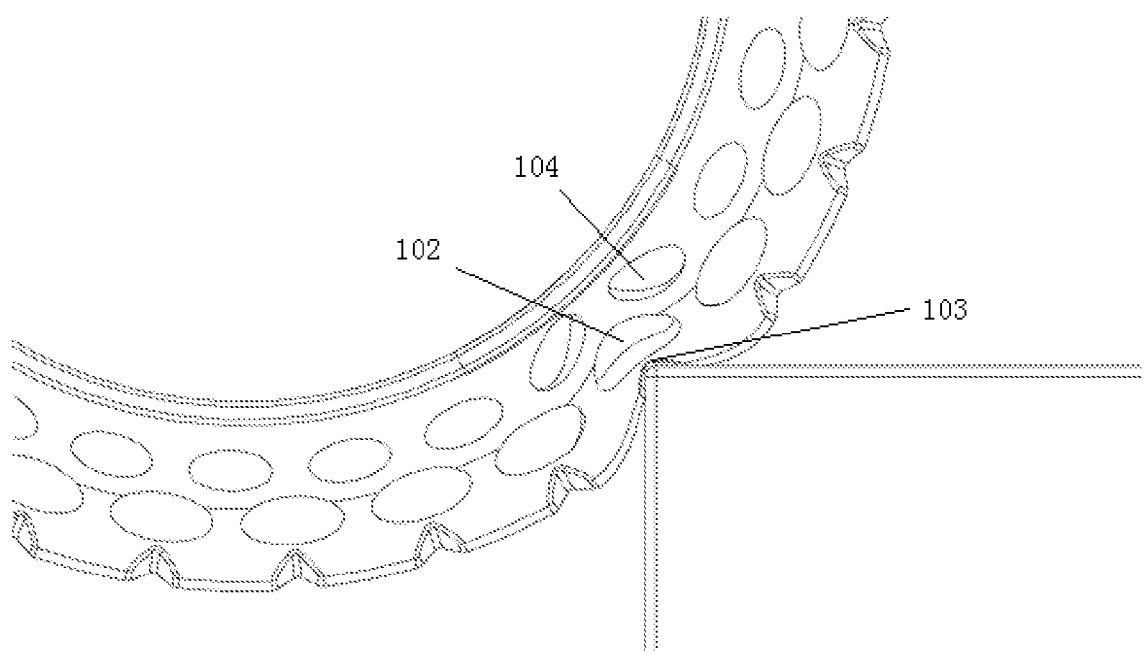
FIG. 8 is a rendering view of a tire of an all-terrain balancing car of the present invention climbing a stair step.

As shown in FIG. 6 to FIG. 8, the embodiment provides an anti-slip tire 1 capable of climbing stairs, comprising a tire main body and several groove structures 101, therein cross sections of inside parts of the groove structures 101 in tire radial directions are fan-shaped, and several groove structures 101 are evenly spaced on a surface of the tire in contact with the ground, and the groove structures 101 can be stuck at protruding corners of the stair steps when climbing the stair steps.

The anti-slip tire 1 can be engaged with the protruding corners of the stair steps by the groove structures 101, so that the tire can be engaged with the protruding corners of the stair steps by the groove structures 101, which makes the anti-slip tire 1 is easy to climb the stair steps when the tires are driven by power.

Because the protruding corners of the stair steps are mostly right angles. In order to better fit the protruding corners of the stair steps, the groove structures 101 are right-angled grooves. In the present embodiment, each of the groove structures 101 comprises a first wall and a second wall which are configured to form an inner wall of a groove, therein an apex angle formed by the first wall and the second wall faces a symmetry center of the tire. In other embodiments, the groove structures 101 may also be asymmetrical structures. For example, when viewed in a rotation direction of the tire, the first wall configured to form the inner wall each of the groove structures 101 is perpendicular to a tire surface 103, and the second wall is at an angle of 45°-90° to the first wall.

As shown in FIG. 6, the tire main body is sleeved on a wheel hub 2, and the tire main body has elastically deformable structures 102 for deforming the tire after the projections are embedded in and press the groove structures 101. The elastically deformable structures 102 are hollow holes that penetrate the tire main body in a width direction of the tire main body. The elastically deformable structures 102 are identical in number to the groove structures 101, and each of the elastically deformed structures 102 is defined adjacent to each of the groove structures 101.

The elastically deformable structures 102 are lateral openings. The tire main body also comprises elastomers 104 located in an inner layer of the tire main body, the elastomers 104 are configured for damping shock. The elastomers 104 are inflatable tire inner tanks or elastic rubber. Each of the elastomers 104 is located between two adjacent elastically deformable structures 102.

The anti-slip tire 1 capable of climbing stair steps of the present embodiment comprises a anti-slip component and a tire body; the anti-slip component comprises: groove structures 101, elastically deformable structures 102; the tire body comprises elastomers 104; therein several groove structures 101 are laterally distributed on a tire surface, and several elastically deformable structures 102 are distributed under the groove structures 101 and are arranged laterally, and are in a middle layer in the entire tire structure; the elastomers 104 are in an inner layer of the tire for absorbing impact energy from a road surface. The anti-slip tire 1 capable of climbing stair steps provided in this embodiment can form a relatively deep concave deformation on an outer layer surface of the tire under a certain pressure when encountering an uneven road surface or a road surface of a right corner (for example, a step). Concave surfaces formed by these deformations can buckle corners of the stair steps, thereby preventing the tire from slipping, so that it is very suitable for use in all-terrain transportation tools, especially all-terrain balance cars or other transportation tools commonly used to climb stairs.

In this embodiment, the elastomers 104 uses aerated structured that can achieve the same shock absorbing effect as a conventional tire when in use.

In this embodiment, the elastomers 104 use non-inflated hole-like structures that correspond one-to-one with the elastically deformable structures 102, and each of the elastomers 104 is located between every two adjacent elastically deformable structures 102, with following advantages: it is inflated and bearing deformations of a tire surface 103 in conformity with the groove structures 101 are maintained during normal driving, thereby avoiding bumps.

In this embodiment, the elastomers 104 can also use other types of inflatable structures.

The concept of the anti-slip tire 1 provided by the embodiment is that when personal transportation tools need to climb the stair steps, it is necessary to have a structure of a certain structure buckled to corners of the stair steps to prevent the tire from slipping, so that the transportation tools can stably and safely climb the stair steps.

The working principle is that when the tire contacts with a corner of a stair steps, the groove structures 101 can initially buckle the corner. During a climbing process, since there is no contact on other surfaces of the tire, all the pressure will concentrate on the groove structures 101, and the groove structures 101 can transmit pressure to the elastically deformable structures 102, causing outer edges of the elastically deformable structures 102 to be inwardly recessed, and concave surfaces of the groove structures 101 are thus largely concaved, and the corner of the stair step are wrapped, thereby firmly locking and preventing the tire from slipping.

In the present embodiment, when the tire travels on a normal road surface and the contact surface of the anti-skid tire 1 with the ground is the tire surface 103, a state of the elastomer 104 is consistent with the deformation when the elastically deformable structure 102 under a pressure, so as to drastically reduce bumps while driving.

In general, the anti-slip tires 1 capable of climbing stair steps make it possible to climb the stair steps with portable personal transportation tools, which will greatly increase passivity of these transportation tools and bring more convenience to users.

In other embodiments, the elastically deformable structure 102 and aperture structures of the elastomers 104 are designed as closed holes of other shapes.

By applying the anti-skid tire 1 provided in this embodiment, a two-wheel independent suspension self-balancing electric vehicle manufactured is stable and safe when climbing stair steps, greatly expanding an application range of the independent suspension self-balancing electric vehicle, and bringing more driving pleasure to a driver.

What is disclosed above is only a preferred embodiment of the present invention, and certainly cannot be used to limit the scope of rights of the present invention. Those skilled in the art can understand all or part of the processes for implementing the above embodiments, and according to the present invention, the equivalent change requested is still within the scope of the invention.

The invention claimed is:

1. An independent suspension self-balancing electric vehicle, comprising a main frame, two wheel assemblies, suspension assemblies, two shock absorbers and a power control module, wherein the two wheel assemblies are respectively defined on both sides of the main frame, the wheel assemblies are connected to the main frame by the suspension assemblies, the shock absorbers are respectively connected to the main frame and the suspension assemblies, and the power control module is configured to drive the wheels to rotate and control the independent suspension self-balancing electric vehicle to steer; and wherein the number of the suspension assemblies are two, each of the wheel assemblies is connected to the main frame by one suspension assembly, and the each of the wheel assemblies individually jumps while the independent suspension self-balancing electric vehicle is driven on an undulating road surface;

wherein the suspension assemblies comprise wheel axle seats connected to the wheel assemblies, and upper swing arms and lower swing arms, first ends of the upper swing arms and the lower swing arms are all hinged to the main frame, second ends of the upper swing arms and the lower swing arms are all hinged to wheel axle seats;

lower ends of the shock absorbers are connected to middle parts of the lower swing arms, and upper ends of the shock absorbers are connected to a side of the main frame close to the wheel assemblies, so that the two shock absorbers are defined obliquely upward and outward;

positions where ends of the shock absorbers are connected to the main frame and the lower swing arms form a splayed shape.

2. The independent suspension self-balancing electric vehicle according to claim 1, wherein the upper swing arms and the lower swing arms are arranged side by side in a vertical plane, and the wheel axle seats, the upper swing arms, the lower swing arms, and the main frame form a quadrangular structure.

3. The independent suspension self-balancing electric vehicle according to claim 2, wherein the upper swing arms are connected to the wheel axle seats and the main frame by movable joints; the lower swing arms are connected to the wheel axle seats and the main frame by movable joints.

4. The independent suspension self-balancing electric vehicle according to claim 1, wherein the upper swing arms are connected to the wheel axle seats and the main frame by movable joints; the lower swing arms are connected to the wheel axle seats and the main frame by movable joints.

5. The independent suspension self-balancing electric vehicle according to claim 1, wherein the suspension assemblies are arranged symmetrically left and right.

6. The independent suspension self-balancing electric vehicle according to claim 1, wherein the wheel assemblies comprises anti-slip tires, wheel hubs mounted inside the anti-slip tires and configured to support the anti-slip tires, and wheel axles for connecting motors and wheel axle seats.

7. The independent suspension self-balancing electric vehicle according to claim 6, wherein each of the anti-slip tires comprises a tire main body and several groove structures, cross sections of inside parts of the groove structures in tire radial directions are fan-shaped, and the groove structures are evenly spaced on a surface of each of the anti-slip tires in contact with the ground, and the groove structures can be stuck at protruding corners of stair steps when climbing the stair steps.

8. The independent suspension self-balancing electric vehicle according to claim 7, wherein the tire main body comprises elastically deformable structures for deforming each of the anti-slip tires after the protruding corners are embedded in and press the groove structures; the tire bodies comprise elastomers defined in an inner layer of the tire body.

* * * * *